US011525924B2

(12) United States Patent
Hauschild et al.

(10) Patent No.: US 11,525,924 B2
(45) Date of Patent: Dec. 13, 2022

(54) METHOD FOR PROVIDING AUTHENTICATED CORRECTION INFORMATION, PLURALITY OF REFERENCE STATIONS AND A REDUNDANT CENTRAL COMPUTATION UNIT, GNS SYSTEM AND SOFTWARE PRODUCT AND/OR NETWORK FOR PROVIDING A CORRECTION INFORMATION MESSAGE IN A GNS SYSTEM OR OTHER MEANS

(71) Applicant: SPACEOPAL GMBH, Munich (DE)

(72) Inventors: André Hauschild, Germering (DE); Andre Bauerhin, Gilching (DE); Christian Arbinger, Munich (DE)

(73) Assignees: DLR GFR MBH, Wessling (DE); SPACEOPAL GMBH, Munich (DE)

( * ) Notice: Subject to any disclaimer, the term of this patent is extended or adjusted under 35 U.S.C. 154(b) by 0 days.

(21) Appl. No.: 17/276,499

(22) PCT Filed: Aug. 6, 2019

(86) PCT No.: PCT/EP2019/071141
§ 371 (c)(1),
(2) Date: Mar. 16, 2021

(87) PCT Pub. No.: WO2020/069786
PCT Pub. Date: Apr. 9, 2020

(65) Prior Publication Data
US 2022/0035041 A1 Feb. 3, 2022

(30) Foreign Application Priority Data
Oct. 5, 2018 (EP) .................................. 18198898

(51) Int. Cl.
*G01S 19/07* (2010.01)
*G01S 19/40* (2010.01)
(Continued)

(52) U.S. Cl.
CPC .............. *G01S 19/07* (2013.01); *G01S 19/40* (2013.01); *G01S 19/00* (2013.01); *G01S 19/38* (2013.01); *G01S 19/42* (2013.01)

(58) Field of Classification Search
CPC .......... G01S 19/07; G01S 19/38; G01S 19/40; G01S 19/42; G01S 19/00
(Continued)

(56) References Cited

U.S. PATENT DOCUMENTS 9,671,501 B2 * 6/2017 Leandro .................. G01S 19/40
10,849,093 B2 * 11/2020 Xie ........................ G01S 5/0072
(Continued)

FOREIGN PATENT DOCUMENTS

EP 2336807 A2 6/2011
JP 2005172738 A 6/2005
(Continued)

OTHER PUBLICATIONS

International Preliminary Report on Patentability PCT/EP2019/071141 filed Aug. 6, 2019; Report dated Mar. 23, 2021.
(Continued)

*Primary Examiner* — Chuong P Nguyen
(74) *Attorney, Agent, or Firm* — Cantor Colburn LLP

(57) ABSTRACT

A method for providing authenticated correction information, in particular orbit, clock and bias/offset correction information, to a mobile receiver in a GNS system, including: receiving raw data from satellites at a plurality of reference stations; forwarding the raw data received at the reference stations to a central computation unit, in particular to a single central computation unit, using a data stream, in
(Continued)

particular a common data stream; determining the correction information at the computation unit based on the raw data received from the different reference stations and transmitting the correction information via at least one satellite to the receiver for reliably determining a position of the mobile receiver.

10 Claims, 4 Drawing Sheets

(51) Int. Cl.
*G01S 19/38* (2010.01)
*G01S 19/00* (2010.01)
*G01S 19/42* (2010.01)

(58) Field of Classification Search
USPC ............ 342/357.44, 357.21, 357.23, 357.25
See application file for complete search history.

(56) References Cited

U.S. PATENT DOCUMENTS

| | | | | |
|---|---|---|---|---|
| 10,908,299 | B1* | 2/2021 | Tadayon | H04W 4/027 |
| 11,079,496 | B2* | 8/2021 | Hsu | G01S 19/40 |
| 11,150,352 | B2* | 10/2021 | Kuntz | G01S 19/37 |
| 11,175,408 | B2* | 11/2021 | Kwon | G01S 19/40 |
| 11,187,813 | B2* | 11/2021 | Brandl | G05D 1/0022 |
| 11,255,976 | B2* | 2/2022 | Strobel | G01S 19/072 |
| 2016/0077213 | A1* | 3/2016 | Xianglin | G01S 19/24 342/357.44 |
| 2016/0231429 | A1 | 8/2016 | Wilson | |
| 2016/0377730 | A1* | 12/2016 | Drescher | G01S 19/44 342/357.23 |
| 2017/0269222 | A1 | 9/2017 | Dai | |
| 2020/0209406 | A1* | 7/2020 | Lin | G01S 19/40 |
| 2021/0318446 | A1* | 10/2021 | Kishimoto | G01S 19/05 |
| 2022/0107427 | A1* | 4/2022 | Kleeman | G01S 19/07 |

FOREIGN PATENT DOCUMENTS

| | | |
|---|---|---|
| JP | 2007187597 A | 7/2007 |
| JP | 2015529023 A | 10/2015 |
| WO | 2009130260 A2 | 10/2009 |

OTHER PUBLICATIONS

International Search Report for corresponding application PCT/EP2019/071141 filed Aug. 6, 2019; dated Oct. 30, 2019.
Written Opinion for corresponding application PCT/EP2019/071141 filed Aug. 6, 2019; dated Oct. 30, 2019.
Gahler et al., "A Galileo E6-B/C Receiver: Signals, Prototype, Test and Performance, Proceedings of the 29th International Technical Meeting of the Satellite", Sep. 16, 2016, pp. 486-496, XP056013928.
I. Rodriguez, "Preparing for the Galileo Commercial Service—Proof of Concept and Demonstrator Development", Sep. 12, 2014, pp. 3399-3410, XP056007963.
T. Melgard, "G2-The First Real-Time GPS and GLONASS Precise Orbit and Clock Service", 22nd International Meeting of the Satellite, Sep. 25, 2009, pp. 1885-1891, XP056010634.

* cited by examiner

METHOD FOR PROVIDING AUTHENTICATED CORRECTION INFORMATION, PLURALITY OF REFERENCE STATIONS AND A REDUNDANT CENTRAL COMPUTATION UNIT, GNS SYSTEM AND SOFTWARE PRODUCT AND/OR NETWORK FOR PROVIDING A CORRECTION INFORMATION MESSAGE IN A GNS SYSTEM OR OTHER MEANS

TECHNICAL FIELD

Method for providing authenticated correction information, plurality of reference stations and a redundant central computation unit. GNS system and software product and/or network for providing a correction information message in a GNS system or other means.

BACKGROUND

The present disclosure concerns a method for providing a set of authenticated correction information to a mobile receiver, a GNS (global navigation satellite) system, a plurality of reference stations and a redundant central computation unit and a software product and/or a network for providing a correction information message in a GNS system or other means.

GNS systems are well known. Examples for GNS systems are GPS, GLONASS, BeiDou and Galileo. They provide the functionality to determine the position of a static or mobile receiver, which can be, for example, integrated into in a mobile phone or a vehicle. Essential parts of a GNS system are satellites, which orbit the Earth and emit navigation signals. The navigation signals consist of a carrier signal with a ranging code and, optionally, navigation data modulated onto the carrier.

The ranging signal in combination with the navigation data is used to determine the position of the receiver.

However, the signal transmission paths of the navigation signals from different satellites to the receiver propagate through different parts of the atmosphere and thus accumulate different delays, caused by be the troposphere and the ionosphere. In addition, the navigation information transmitted by the satellite, which contains the satellite's position, dock offset and signal biases, are affected by errors. As a consequence, navigation signals received by the receiver have different biases or offsets and thus degrade the accuracy of position determination.

For the computation of corrections to these errors and eliminating them at the receiver, a network of global or regional reference station network can be used for the generation of differential GPS (DGPS) or GNSS corrections. The reference station network consists of fixed receiver stations in the proximity of the mobile receiver. These stations broadcast the difference between measured satellite pseudoranges and modelled pseudoranges based on the known station position, and the mobile receivers apply these corrections to their measured pseudorange. The correction signal is typically broadcast locally via groundbased radio transmitters of shorter range. To overcome the limited accuracy of the pseudorange measurements, differential processing is also done using the more precise carrier-phase observations. This technique is known as realtime kinematic (RTK) positioning and is based on ambiguity resolution of differential carrier-phase measurements between the mobile receiver and a real or virtual reference station. The disadvantage of this system lies in the necessity to have a stationary receiver station close to the mobile receiver, thus, it is not helpful in areas without infrastructure to support a dense reference station network.

For improving the positioning accuracy without the dependency on a dense reference station network in the vicinity of the mobile receiver, the precise point positioning (PPP) method has been developed. In contrast to the DGPS or RTK, the PPP approach does not rely on the spatial error correlation of differential measurements, but instead eliminates the individual error components caused by, for example, satellite orbit or dock, biases and atmospheric delays, through precise models in the calculation of the position for the mobile receiver. Thus, it is possible to calculate positions accurate to a decimetre or even below with dual-frequency measurements. It is essential for realizing such an accuracy to provide precise correction information, in particular precise orbit and clock correction information. Further, PPP allows a precise determination of the position of the mobile receiver even in regions without a dense reference station network. Examples for the PPP method can be found in EP 2 281 210 B1 and EP 10 194 428 A2.

BRIEF SUMMARY

Taking the above into account, the disclosure provides correction information, in particular a combination of orbit error, clock offset, signal bias and atmospheric delay correction information into a single message stream to the mobile receiver, such that the correction information are effectively distributed, authenticated and reliable in operation.

According to a first aspect a method for providing correction information, in particular orbit, clock and/or bias/offset correction information, to a receiver in a GNS system, is provided, comprising:

receiving raw data from satellites at a plurality of reference stations;

forwarding the raw data received at the reference stations to a central computation unit in a realtime data stream, in particular to a central computation unit;

determining the correction information at the single computation unit based on the raw data received from the different reference stations and transmitting the correction information via at least one satellite to the receiver for determining a position of the receiver.

Contrary to the state of the art, a central computation unit collects all raw data and determines the correction information, in particular the combined orbit error, clock offset, signal bias and atmospheric delay correction information, and subsequently the authenticated correction information message is transmitted to the mobile receiver via at least one GNS (global navigation satellite), preferably via each GNS that provides the raw data to the certain mobile receiver. Thus, it is possible to take the raw data of a large number of reference stations into account for determining the correction information for establishing the desired accuracy at one central computation unit. Further, the present disclosure allows central dissemination of the correction information. As a consequence, no communication between different distribution centres is needed. Another benefit of using the GNS for broadcasting the correction information is the possibility of using the infrastructure already available from existing satellites and no additional terrestrial or spaceborne transmitters are needed.

Preferably, it is provided that a large number of stationary reference stations are evenly distributed around the globe and the locations of the reference stations are precisely known. It is conceivable that there are regions having an increased density of reference stations and there are regions having a decreased density of reference stations. In particular, it is provided that at least 5 reference stations, preferably more than 10 reference stations and most preferably more than 15 reference stations, concurrently receive the navigation signal of one satellite. The generated raw data stream originated from the reference stations comprises observations on at least two frequencies and a data rate of at least 1 Hz to be transmitted to the central computation unit. The correction data is computed based on differences between measured and modelled pseudorange and carrier-phase observations at the central processing unit. Raw input data are stored as an internal buffer for access by a Kalman filter and additionally recorded in observation files. Finally, the computed correction information message is included in the data channel of a carrier signal transmitted from one or multiple spacecraft.

Furthermore, it is preferably considerable that the correction information, at least a part of the correction information, is provided to the mobile receiver via a terrestrial system.

Examples for realizing a PPP approach can be found in EP 10 94 428 A2 and in EP 2 281 210 B1 of which the contents regarding PPP are herewith referred to explicitly.

Part of the correction information is a correction for the satellites' onboard clock offset. Clock corrections are necessary due to unpredictable clock offset or clock drift variations. Preferably, it is provided to provide the clock correction information based on the raw data of several different reference stations that form a global network. It should be mentioned that the reference stations locations differ and are complementing the stationary receiving stations that are used for the GNS system. Preferably, the clock correction is provided in realtime for realizing a comparably short latency, for example shorter than 10 sec, in order to determinate the current position in the most precise way. Preferably, for determining the clock correction, a sequential filter such as the Kalman filter is used. The Kalman filter preferably processes the raw data from a global reference station network. These reference stations transfer their raw data in realtime as data stream.

Besides the raw data, in particular the realtime data stream, the Kalman filter uses predicted orbits and clocks, differential code biases, Earth Orientation Parameters (EOPs), antenna phase pattern information and information on the operational status of each GNS. The predicted part of an ultrarapid orbit product is used as a priori information during data processing. The orbits are updated at least four times each day with a latency of less than three hours relative to the last observations. When new orbit predictions become available, they are updated in the filter to assure that the most precise orbit information is available.

The differential code bias corrections must be used, since not all stations and receivers track the same signals in the same tracking mode. Furthermore, the most recent predicted earth orientation parameters (EOP) are retrieved from an EOP service provider. The most recent antenna phase centre offsets (PCO) and variations (PCV) according to standardized conventions are used for the computation of the clocks correction. For precise positioning, the phase centre of an antenna cannot be defined as a fixed point, because elevation and azimuth dependent phase reception patterns must be taken into account. Therefore, each GNSS antenna is characterized using a constant phase centre offset vector and a table, which holds the information for the phase reception pattern.

Finally, up to date information about the current status of the GNS constellation must also be present for determination of the clock correction. Satellites are frequently set unusable due to orbital maneuvers or maintenance and must be excluded from the estimation during these periods. The automatic exclusion of satellites from the estimation is done for all GNS based on the satellite health status in the navigation data.

According to a preferred embodiment of the present disclosure it is provided that a plausibility check of the raw data is performed at the central computation unit. In particular, the plausibility check is done to assure consistency of the received observations and the reference station position. Preferably, several plausibility checks, in particular several different plausibility checks, of the raw data are performed. Otherwise, using an incorrect reference station position in the estimation adversely affects the quality of the derived corrections and therefore reduces the accuracy of determining the current position of the mobile receiver. Therefore, the plausibility check is essential to guarantee high accuracy in the estimation of the corrections for determining the position of the mobile receiver.

Preferably, it is provided that in addition to the correction information a navigation information is transmitted via the at least one satellite, i.e. a signal including the navigation information and a signal including the correction information were transmitted via the same satellite, namely the at least one satellite transmitting the correction information. Therefore, it is advantageously possible to receive signals including the navigation information and the correction information by the same antenna of the receiver, since they were transmitted or forwarded via the same at least one satellite. As a consequence, the receiver needs no additional antenna and demodulation unit for receiving correction information typically transmitted via a geostationary satellite otherwise. In advance, using only one antenna at the receiver side, overall complexity of the receiver is reduced, additionally. In particular, transmitting navigation information and correction information via the same at least one satellite differs from the known prior art according to which the navigation signal is transmitted via GNSS satellites and the correction information are forwarded via a geostationary satellite. Therefore, transmitting the information signal and the correction information via the same at least one satellite has the additional benefit of needing only four satellites for a precise positioning by PPP. Contrary, the system transmitting the correction information via the geostationary satellite needs at least five satellites (four satellites for determining the position and one satellite transmitting the correction information). Furthermore, transmitting the navigation information and the correction information via the same at least one satellite guarantees that the receiver gets both the correction information and the navigation information as soon as he receives the signals from the at least one satellites, i.e. the navigation information and the correction information cover the same regions simultaneously. Moreover, it is preferably provided that the navigation information is included in a first signal having a first carrier frequency, in particular being part of a first frequency band, and the correction information is included in a second carrier frequency, in particular being part of a second frequency band. Examples for the first and the second frequency band are E1, E5a, E5b and E6. In other words: Although the navigation information and the correction information are transmitted via the same at least one satellite, the information may be incorporated in different signals having different carrier frequencies. In particular, the satellites are configured to forward both the navigation information and the correction information.

Furthermore, it is preferably provided that the at least one satellite orbits earth in a height between 200 km and 30,000 km, preferably between 900 km and 28,000 km and most preferably between 18,000 km and 26,000 km. In other words: the method excludes the use of geostationary satellites that orbits earth in a height of about 36,000 km. In particular, the distance refers to a mean height of the satellite's orbit above the equator. Preferably, the method uses satellites travelling in the Medium Earth Orbit (MEO) and/or Low Earth Orbit (LEO). In other words: the at least one satellite is a non-geostationary satellite or no quasi-zenith satellites, i.e. the at least one satellite is not on a geostationary or quasi-zenith inclined eccentric orbit. Instead, the method uses satellites that use one or more inclined orbital planes having an eccentricity of less than 0.2, more preferably 0.02 and most preferably less than 0.002. Preferably, the satellites orbit the earth having a maximum inclination between 45° and 80°, more preferably 50° and 70° and most preferably between 52° and 63°. The terms "inclination" or "inclined orbit" mean an orbit being inclined relative to the Earth's equatorial plane. The term "orbital plane" means multiple satellites are spaced and following the same orbital path, whereas one or more different orbital planes are crossing each other in the same intersection point by having the same inclination. As a consequence, no inclination, i.e. an inclination having the value 0°, means that the satellites mainly follows the course of the equator, whereas an inclination of 90° refers to satellites that pass the poles during orbiting the earth.

Preferably, it is provided that the at least one satellite orbits earth with an eccentricity of less than 0.2, more preferably less than 0.05 and most preferably less than 0.02 or even less than 0.002 and/or in one or more inclined orbital planes, wherein, in particular, at least three satellites, in particular at least three satellites of the whole system of satellites used for the method, orbit earth with an eccentricity of less than 0.05 or preferably 0.002.

In particular, it is provided that five or more satellites, preferably 18 or more satellites and most preferably 25 or more satellites were used for providing the correction information and/or the navigation information. Using 18 satellites allows providing the correction information globally, such that the system and the method can be used for a global operable method for determining the position of the receiver, precisely by using the correction information. Using even more than 18 satellites allows redundancy regarding transmitting the correction information and/or the navigation information.

In another embodiment it is provided that the correction information is additionally transmitted via a terrestrial channel. For example, the correction information are forwarded via local terrestrial channels. Thus, it is advantageously possible to perform a plausibility check by comparing the correction information transmitted via the at least one satellite and the terrestrial channel. Furthermore, the terrestrial signal can be used as a backup for such scenarios, in which the correction information is not available.

Preferably, it is provided that the plausibility check is performed before determining the correction information to safely exclude inconsistent data from the Kalman filter estimation. Preferably, the plausibility check is performed on each epoch of observations transmitted by in each stream.

Preferably, for the plausibility check the method further comprises:
determining the position of a certain reference station based on the raw data assigned to the certain reference station and
comparing the determined position with a reference value. In other words: the raw data assigned to a certain reference stations are used at the central computation unit for determining the position of the reference station. In the case that the determined position of the reference station does not match the reference value within a predefined threshold, the plausibility check fails. Alternatively or additional, it is also considerable to calculate residuals and remove those measurements or observations having a residual exceeding a certain threshold, wherein excluding measurements or observation in that manner is preferably done by a statistical test.

In another embodiment of the present disclosure, it is provided that the reference value is saved at a memory device of the central computing unit. Thus, it is possible to rely on reference values being permanent available to the central computation unit. For example, the reference value corresponds to geographical position, such as a set of coordinates.

In particular, it is provided that at least a part of the raw data is excluded and/or a warning signal is generated, when a difference between the determined position and the reference value exceeds a threshold. Thus, it can be guaranteed that the invalid raw data does not manipulate determining the correction information. By informing the operator of the GNS system by an alarm and/or warning massage, the operator at the central computation unit can be made aware of a problem in the data stream. For example, the operator is informed by a text massage, an acoustic signal and/or an optical signal.

Furthermore, it is preferably provided that the threshold is larger than the spatial resolution that can be established by using the clock correction information. Thus, it is possible to rely on the pure raw data without correction for performing the plausibility check. This reduces the computational workload and accelerates the plausibility check. As a consequence, the plausibility check can be performed in realtime without extending the time for providing the correction information, significantly.

According to another embodiment of the present disclosure, it is provided that the correction information is uploaded through at least one uplink station for dissemination by at least one GNS satellite. Preferably, several uplink stations provide a continuous stream of corrections simultaneously to several GNS satellites.

In particular, it is provided that the correction information is provided for performing a precise point positioning (PPP) method to determine the position of the receiver.

In another preferred embodiment, it is provided that the correction information and a navigation information are uploaded through at least one uplink station for dissemination by at least one satellite, wherein the uplink station directs its antenna such that the antenna follows the movement of the at least one satellite. By following the current location of the satellite by the antenna, the navigation information and the correction information can be transmitted to the satellite as long the satellite is in sight of the uplink station. Furthermore, it guarantees that the correction information can be provided to satellites that orbits earth for providing correction information and/or navigation information globally. In particular, it is provided that the uplink stations communicate with a single satellite as long as this satellite is in sight of the antenna and/or the uplink station switches communication from one satellite to another according to a defined schedule. In particular, it is provided to use a plurality of uplink stations being distributed over the globe/earth for providing the correction information and/or the navigation information globally.

According to another preferred embodiment, it is provided that the navigation information and/or the correction information are encrypted. Using the encryption advantageously allows guaranteeing that the provided correction information origins from a trusted source. Preferably, it is possible to control the encryption, such that providing navigation information and/or correction information can be separately provided to a user, depending on an access level.

Furthermore it is preferably provided that there are more than 50, preferably more than 75 and most preferably more than 100 reference stations. Thus, it is possible to provide at least 5 reference stations, preferably more than 10 reference station and most preferably more than 15 reference stations which receive the navigation signal of one satellite. This has a positive effect on the accuracy of the correction information, which can be improved with increasing number of reference stations.

Another aspect of the present disclosure is a plurality of reference stations and a central computation unit, in particular a single central computation unit in hot redundancy, configured for receiving raw data from satellites at a plurality of reference stations;

forwarding the raw data received at the reference stations to a central computation unit, in particular to a single central computation unit, using a real time data stream, in particular a common data stream;

determining the correction information at the computation unit based on the raw data provided or received from the different reference stations and transmitting the correction information via at least one satellite and/or terrestrial communication means to the receiver for determining a location of the mobile receiver. The features and benefits described in the context of the method for providing the correction information apply to the plurality of reference stations and the central computation unit analogously and vice versa. In particular, the term "hot redundancy" preferably means for the skilled person that a backup system is directly used in the case of a breakdown or error of the system. For example, the backup system comprises the last valid correction information. In particular, the terrestrial communication means is used, when the bandwidth of the communication channel for communicating with the satellite is too limited for transferring all correction information. It is also conceivable to transfer the correction information subsequently via the satellite to the mobile receiver.

Another aspect of the present disclosure is the use of a global navigation satellite system comprising of several space vehicles for distributing the correction information messages to the mobile user receiver worldwide.

The features and benefits described in the context of the method for providing the correction information apply to the plurality of reference stations, the central computation unit, and/or the mobile user receiver analogously and vice versa.

Another aspect of the present disclosure is a software product and/or a network, wherein the software product comprises program code for implementing the method according to the present disclosure. The features and benefits described in the context of the method for providing the correction information apply to the software and/or the network analogously and vice versa.

A further aspect of the present disclosure is the use of the correction information in applications with high requirements on safety and security, for which it is necessary to authenticate the correction information in order to allow for the verification at the receiver, that the correction information has been transmitted by a trusted source.

An authentication architecture and process enables eligible users to verify that the correction information originates from a credible source and that the content, timing or sequences of correction messages were not modified. The integrity of an augmentation information is guaranteed. In order to optimize the authentication data, the chosen architecture and process mitigate computational costs and end-toend latency. It shall also incorporate correction mechanisms to counteract transmission errors and message losses.

Wherever not already described explicitly, individual embodiments or their individual aspects and features can be combined or exchanged with one another without limiting or widening the scope of the described disclosure, whenever such a combination or exchange is meaningful and in the sense of this disclosure. Advantages which are described with respect to one embodiment of the present disclosure are, wherever applicable, also advantageous of other embodiments of the present disclosure.

DESCRIPTION

Figure 1:
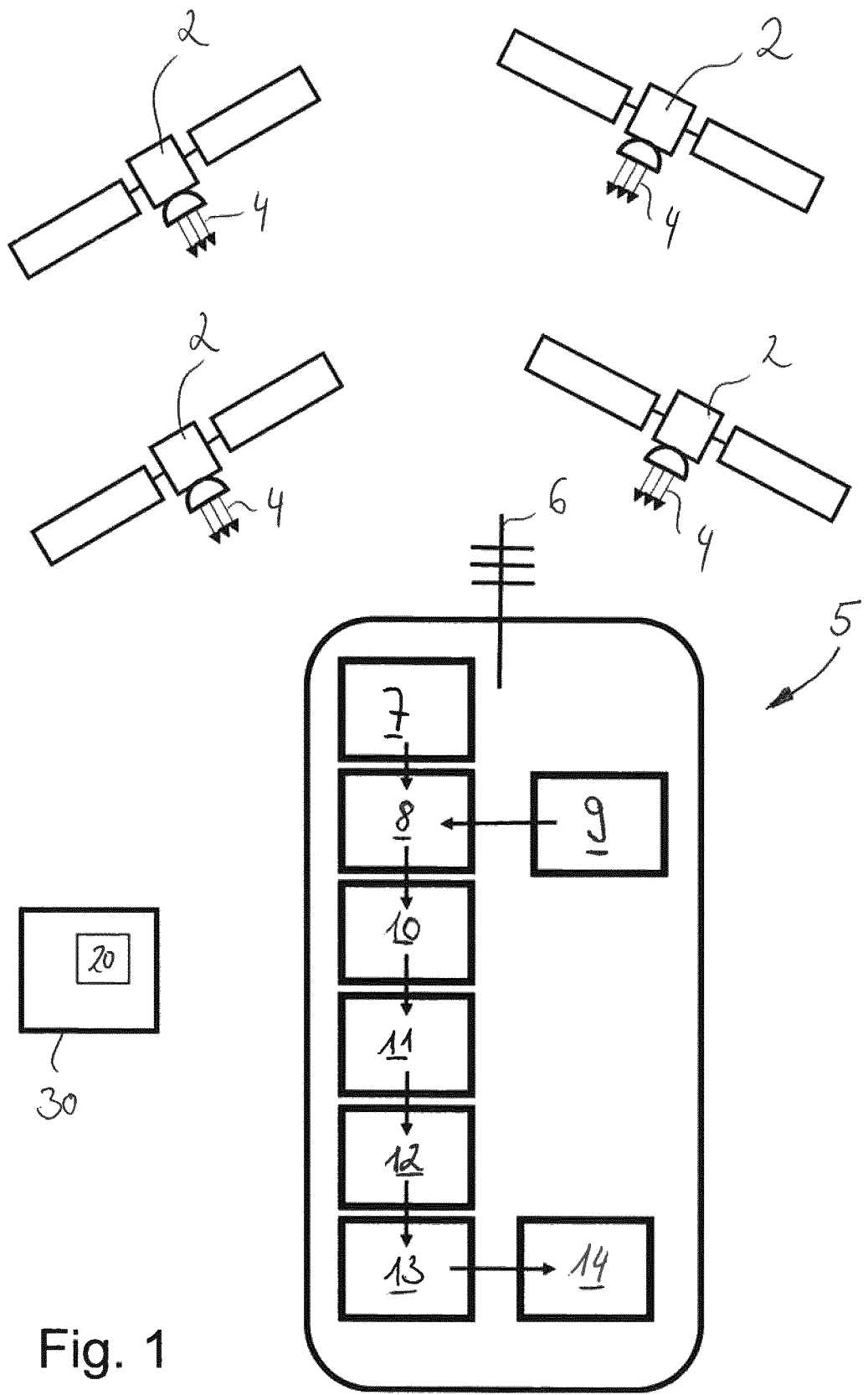
FIG. 1 schematically illustrates a first part of a method for providing a clock correction according to a first preferred embodiment of the present disclosure, FIG. 2 schematically illustrates a second part of the method for providing a clock correction according to a first preferred embodiment of the present disclosure, FIG. 3 schematically shows a flow diagram illustrating the method according to the FIGS. 1 and 2 and FIG. 4 schematically shows a flow diagram illustrating a plausibility check of the raw data according to a second preferred embodiment of the present disclosure.

In FIG. 1 a method for determining the position of a mobile receiver 5 by using a global navigation satellite system (GNS system) is illustrated. A global navigation satellite system comprises satellites 2 orbiting around the earth 14 and emitting navigation signals 4 modulated on a number of carrier frequencies. The navigation signals 4 are received by a mobile receiver 5, such as a mobile navigation system that might be incorporated in a mobile unit and/or a vehicle, via an antenna 6. The received navigation signal 4 comprises raw data for determining the position, in particular the actual position, of the mobile receiver 5. The antenna 6 is connected to a band pass filter and low noise amplifier 7, in which the received navigation signal 4 are amplified. In a subsequent down converter 8 that is connected to the band pass filter and low noise amplifier 7 and to a reference oscillator 9, the received navigation signal 4 is converted to lower frequencies using the oscillating signal from the reference oscillator 9. The down converted navigation signal is passing a band pass and sampling unit 10, in which the analogue navigation signal 4 is sampled. The sampled navigation signal 4 is then passed to a tracking unit 11, where the navigation signals 4, in particular phases of carrier signals and/or the delay of code signals included in the navigation signal 4, are tracked. The tracking unit 11 is followed by a bias subtraction unit 12, in which phase and/or code biases are subtracted from the phases of the carrier signals and from the code signal. A subsequent position estimation unit 13 determines the actual position of the navigation device 5 based on phase signal obtained by processing the carrier signal and based on the codes signals. The results of the position estimation can finally be displayed on a monitoring device 14.

The received GNS signal 4 is used by the mobile receiver 5 to generate pseudorange and carrier-phase measurements and decode the navigation data containing the coarse satellite position, clock offset and signal biases. In addition, the mobile receiver 5 decodes the correction data information 20 disseminated from a subset of the tracked satellites 2 on a subset of the GNS signals 4. The precise correction data is then used in combination with the coarse navigation data to precisely model the pseudorange and carrier-phase measurements and correct for atmospheric delays. The precisely modelled observations enable the mobile receiver, to compute a precise estimate of the position, in particular the actual position, using PPP.

Figure 2:
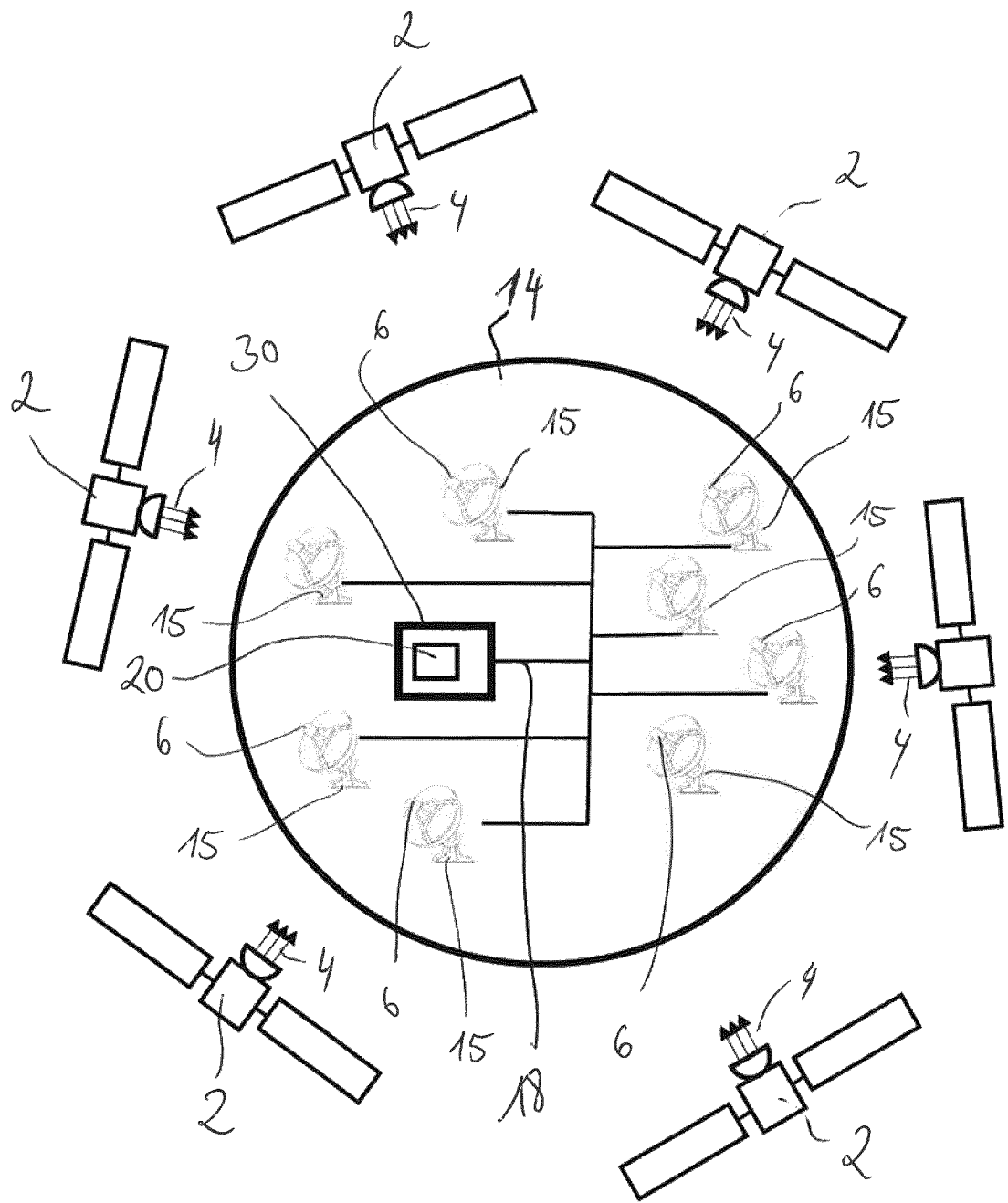

In FIG. 2 reference stations 15 are illustrated. These reference stations 15 are distributed around the globe 14 and receive the navigation signals 4 by their antennas 6. The reference stations 15 generate raw observable data, which are used to determine correction information 20 by using the fact that the position of the reference station 15 is known as well as multiple reference stations are receiving the navigation signal from the GNS satellites.

In contrast to a Real Time Kinematic (RTK) solution, which requires a local base station and a link to the mobile receiver in proximity of a few km for distribution of the correction data, the Precise Point Positioning (PPP) technique works globally, hence without local base station and direct radio link with the mobile receiver.

Here the correction information 20, which takes into account corrections for satellite orbit and clock, offsets errors, ionospheric delay, tropospheric delay, code biases and/or phase biases are transmitted to the mobile receiver 5 via satellite based or terrestrial links.

For determining the correction information 20 it is provided to receive raw data of a set of several satellites 2 by at least one reference station 15. Furthermore, there are additional reference stations 15 that receive raw data from another set of satellites 2 or the same set of satellites 2. Furthermore, it is provided that the received raw data are forwarded to a central computation unit 30, preferably in form of a data stream 18. In particular, the raw data included in the data stream 18 are each assigned to a certain reference station 15.

Preferably, the raw data assigned to the respective reference station 15 are forwarded to the central computation unit 30 together with other raw data from different reference stations 15 in a data stream 18, in particular in a common data stream. The central computation unit 30 comprises a processor that is configured to determinate the correction information 20, in particular for each of the satellites 2 individually.

Figure 3:
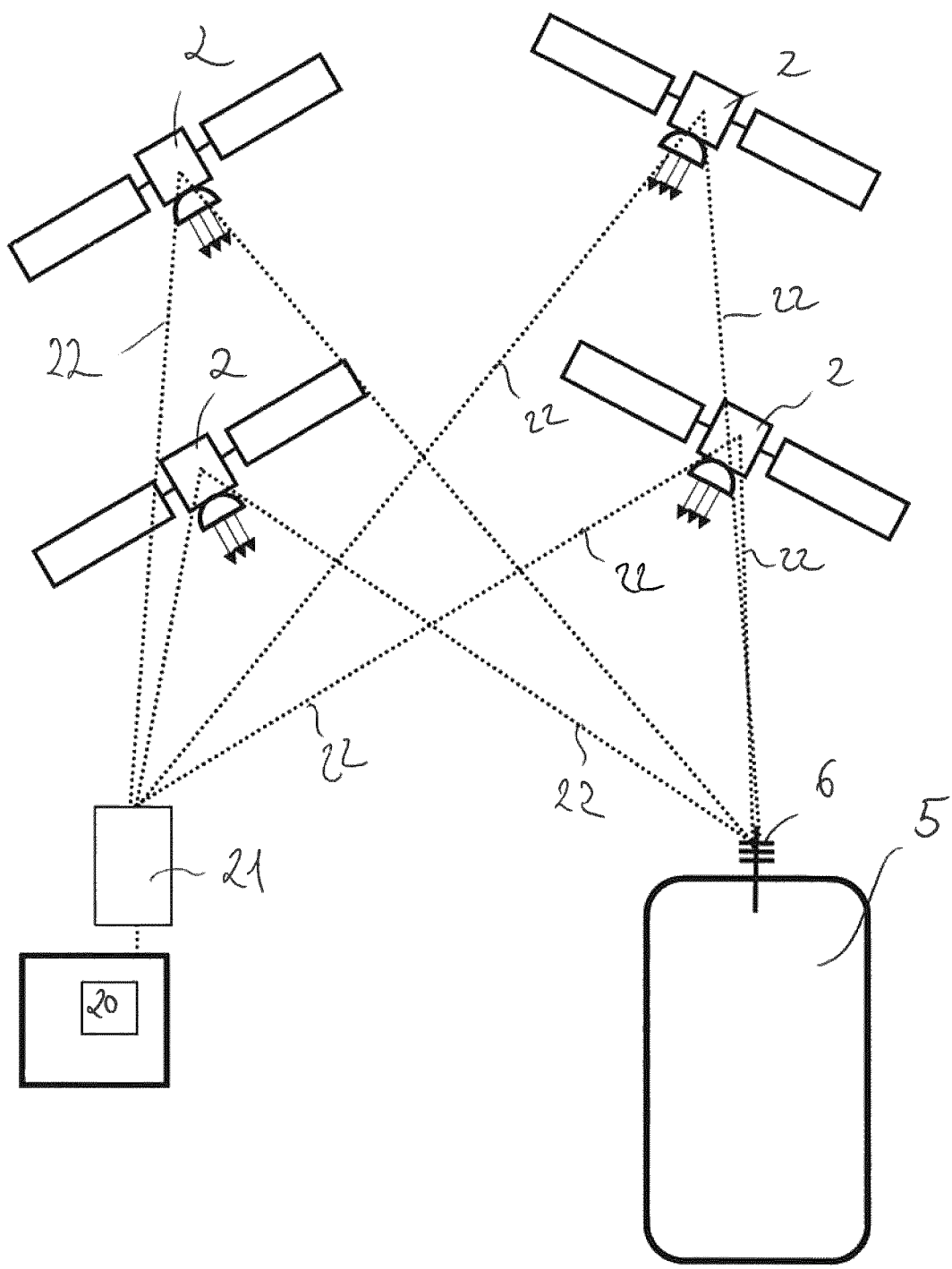

The determined, in particular calculated, authenticated correction information 20 is transmitted from the central computation unit 30 to the mobile receiver 5 via at least one satellite 2 as it is illustrated in FIG. 3. For example, the correction information is uplinked at an uplink station 21 such that a correction signal 22 including in the correction information 20 is transmitted to the mobile receiver 5 via the at least one satellite 2. Preferably, the respective correction information 20 is provided to the mobile receiver 5 by several satellites 2, in particular all satellites 2 that are available for the mobile receiver 5.

Figure 4:
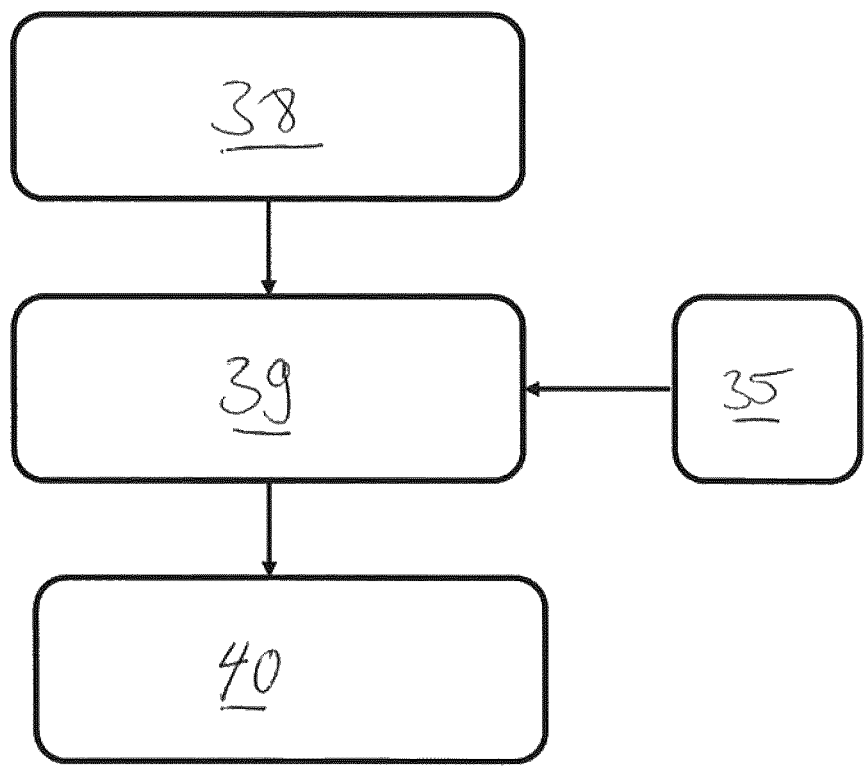

In FIG. 4 a flow diagram illustrating a plausibility check of the raw data according to a second preferred embodiment of the present disclosure is shown. There is a certain probability that the raw data included in the data stream 18 that is received at the central computation 30 unit are wrongly referenced or assigned. This would cause an error in determining the correction information 20, and subsequently affects the accuracy of determining the position of the mobile receiver 5. For avoiding that corrupted raw data are taken into account for determining the correction information, a plausibility check is performed at the central computation station 30, in particular for each set of raw data of the data stream 18. For performing the plausibility check it is preferably provided that the raw data assigned to the certain reference station 15 are used to determinate 38 the position of said certain reference station 15 based on the raw data. Further, the determined position of the reference station 15 is preferably compared 39 to a reference value 35 such as a saved geographic information of said reference station 15, in particular its geographical position. In the case the difference between the determined position of the reference station 15 based on the raw data and the geographic position is larger than a threshold, the raw data of this reference station 15 are excluded 40 from determining the correction information 20. Preferably, this raw data are extracted/removed from the data stream 18 and/or a warning signal is generated.

The invention claimed is:

1. A method for providing correction information, in particular orbit, clock and/or bias/offset correction information, to a mobile receiver in a GNS system, comprising:
   receiving raw data from satellites at a plurality of reference stations;
   forwarding the raw data received at the reference stations to a single-central computation unit in a real-time data stream;
   determining the correction information at the computation unit based on the raw data received from the different reference stations, the correction information being provided for performing a precise point positioning method to determine the position of the mobile receiver, and
   transmitting the correction information via at least one satellite to the mobile receiver for determining a position of the mobile receiver and
   receiving the correction information via the at least one satellite from the single computer unit,
   wherein in addition to the correction information a navigation information is transmitted via the at least one satellite, wherein navigation information and/or the correction information are encrypted, wherein a plausibility check of the raw data is performed at the central computation unit, further comprising, for the plausibility check, determining a position of a certain reference station based on the raw data assigned to the certain reference station and comparing the determined position with a reference value, wherein the raw data are excluded when a difference between the determined position and the reference value exceeds a threshold, wherein the threshold is larger than a spatial resolution, which can be established by using clock correction information.

2. The method according to claim 1, wherein the at least one satellite orbits earth in a distance between 200 km and 30,000 km.

3. The method according to claim 1, wherein the at least one satellite orbits earth with an eccentricity of less than 0.2 and/or in an inclined orbit.

4. The method according to claim 1, wherein five or more satellites are used for providing correction information and/or navigation information.

5. The method according to claim 1, wherein additionally the correction information is transmitted via a terrestrial channel.

6. The method according to claim 1, wherein the correction information is uploaded through at least one uplink station for dissemination by at least one satellite.

7. The method according to claim 1, wherein the correction information and a navigation information are uploaded through at least one uplink station for dissemination by at least one satellite, wherein the uplink station directs its antenna such that the antenna follows the movement of the at least one satellite.

8. The method according to claim 1, wherein there are more than 25 reference stations.

9. A plurality of reference stations and a central computation unit, single central computation unit, configured for
receiving raw data from satellites at a plurality of said reference stations;
forwarding the raw data received at the reference stations to said central computation unit using a data stream;
determining the correction information at the computation unit based on the raw data provided from the different reference stations, the correction information being provided for performing a precise point positioning method to determine the position of the mobile receiver
receiving the correction information via the at least one satellite from the single computer unit,
wherein in addition to the correction information a navigation information is transmitted via the at least one satellite, wherein navigation information and/or the correction information are encrypted, wherein a plausibility check of the raw data is performed at the central computation unit, further comprising, for the plausibility check, determining a position of a certain reference station based on the raw data assigned to the certain reference station and comparing the determined position with a reference value, wherein the raw data are excluded when a difference between the determined position and the reference value exceeds a threshold, wherein a spatial resolution is established by using clock correction information and
transmitting the correction information via at least one satellite and/or terrestrial communication means to the mobile receiver for determining a position of the mobile receiver, wherein in addition to the correction information a navigation information is transmitted via the at least one satellite, wherein navigation information and the correction information are encrypted, wherein a plausibility check of the raw data is performed at the central computation unit, further comprising, for the plausibility check, determining a position of a certain reference station based on the raw data assigned to the certain reference station and comparing the determined position with a reference value, wherein the raw data are excluded when a difference between the determined position and the reference value exceeds a threshold, wherein a spatial resolution is established by using clock correction information.

10. A computer program product, comprising a non-transitory computer-readable medium having computer-readable program code stored thereon, the computer-readable program code comprising instructions that when executed by a processor, cause the processor to implement the method of claim 1.

* * * * *